United States Patent [19]
Wilson et al.

[11] 3,969,286
[45] July 13, 1976

[54] EPOXY RESIN

[75] Inventors: Glenn R. Wilson; Ival O. Salyer, both of Dayton; George L. Ball, III, West Carrollton, all of Ohio

[73] Assignee: The United States of America as represented by the United States Energy Research and Development Administration, Washington, D.C.

[22] Filed: Mar. 24, 1972

[21] Appl. No.: 237,872

[52] U.S. Cl. .......................... 260/2.5 EP; 260/2 N; 260/18 EP; 260/47 EN; 260/836
[51] Int. Cl.$^2$............................................. C08J 9/30
[58] Field of Search .................... 260/2.5 EP, 18 EP

[56] References Cited
UNITED STATES PATENTS

| | | | |
|---|---|---|---|
| 3,144,421 | 8/1964 | Yost | 260/18 EP |
| 3,154,504 | 10/1964 | Carey | 260/2.5 EP |

Primary Examiner—Morton Foelak
Attorney, Agent, or Firm—Bruce Stevens

[57] ABSTRACT

By mixing one part of a prepolymer containing a polyamine partially polymerized with an organic epoxide and subsequently reacted with a fatty acid containing from 8 to 32 carbon atoms, and then reacting this prepolymer mixture with 3 parts of an organic epoxide, a composition was obtained which made a gas frothable, shear-stable, room temperature curing, low density foam. A particularly advantageous prepolymer was prepared using a polyamine selected from the group consisting of diethylenetriamine, triethylenetetramine, and tetraethylenepentamine, partially polymerized with an organic epoxide having an average molecular weight of about 350 and having an epoxide equivalent of 185 to 192, and reacted with 2–10 weight percent linoleic acid. When one part of this prepolymer was reacted with about three parts of epoxy, and frothed by whipping in air or nitrogen an epoxy foam was produced which could be troweled onto surfaces and into corners or crevices, and subsequently cured, at near ambient temperature, to a strong dimensionally stable foam product.

3 Claims, No Drawings

EPOXY RESIN

The invention described herein was made in the course of, or under, Contract W-7405-ENG-48 with the U.S. Atomic Energy Commission.

BACKGROUND OF THE INVENTION

The present invention relates to certain novel compositions of matter and the method of preparing such compositions which comprises reacting three parts of an organic epoxide with one part of a modified epoxy prepolymer containing a fatty acid.

Epoxy resins are well known in the art, and have matured into sophisticated materials capable of meeting the requirements of new applications. Typical uses for epoxies include protective coatings, adhesives, laminates, potting, castings, compression and transfer molding.

The most common, or conventional epoxy resins are obtained by reacting epichlorohydrin with a polyhydroxyl compound, such as Bisphenol A, in the presence of a catalyst. By varying the ratio of epichlorohydrin to Bisphenol A, resins may be produced which range from low viscosity materials to high melting solids. As the length of the molecule increases, the epoxide value decreases, and the hydroxyl equivalent increases.

The selection of the proper curing agent for a particular application can be determined after considering the end use requirements. Viscosity of the mixture, system working life, curing cycle and the operating environment are some factors to be considered when selecting a curing agent. Generally when an epoxy resin is cured catalytically, the catalyst opens the epoxy group to permit the molecules to co-react with one another. Typical epoxy resin catalysts are short chain amides, tertiary amines, nonfunctional secondary amines and Lewis acid complexes. The catalyst concentration must be determined empirically for each system, and the cured properties of the epoxy vary, depending on the materials employed.

Cross-linking comonomers are coupled directly into the cured system as integral members of the molecular network. These comonomer hardners react with the epoxy group. Typical amine cross-linking agents are diethylenetriamine, triethylenetetramine, aminoethyl piperizines, polyamides and primary aromatic polyamines.

Foamed epoxy resins are also well known in the art. The standard practice in making epoxy resin foams has been to mix the resin with an amine curing agent and a blowing agent at temperatures below the thermal decomposition temperatures of the blowing agent, filling a suitable mold cavity with the mixture and heating the mixture so that the blowing agent decomposes with the evolution of gas and concurrent foam generation, the resin curing to its thermoset condition under the influence of the curing agent. An improvement to this standard practice was taught in U.S. Pat. No. 3,223,654 to Nickerson, et al. wherein a prepolymer of epoxy and a polyamine was reacted with additional epoxy and additional polyamine, which not only cured the epoxy, but provided the exothermic reaction to decompose the blowing agent. An epoxy foam insulation material prepared from an epoxy, siloxane and a polyamineamide, preferably an adduct of the Diels-Alder dimerization of linoleic acid reacted with a polyamine, was taught in U.S. Pat. No. 3,296,153 to Snorgren. Further, U.S. Pat. No. 2,993,014 to Schardt taught that a polyamide, the condensation product of a dimerized fatty acid and a polyamine, would cure an epoxy.

Despite the advances made in the prior art, they failed in one or more ways to produce a gas or air frothable epoxy foam that cured at room temperature in less than an hour, but cured sufficiently slow and that was shear-stable to permit troweling. In none of the referenced prior art was the foam produced by simple whipping-in of air or $N_2$ using a Hobart or Kitchen-Aid type of mixer similar to that employed for whipping cream or frothing egg whites. Additionally, many compositions in the prior art cured the epoxy in such a short time that it could not be troweled. Other formulations could not be cured at room temperature within a reasonable time while others did not produce a stable foam.

Despite the advances made in the prior art, and the knowledge of how to formulate a specific epoxy system to meet specific requirements, we found, surprisingly, that the incorporation of a fatty acid into a specific epoxy system produced a formulation that could be frothed readily. The thixotropic foam was very stable, and in addition to being poured onto surfaces or into molds could be applied to many sufaces using a trowel or spatula. The system cures at room temperature to produce either a flexible or rigid foam, depending on minor variations in the formulation, that can be used as an adhesive, as insulation, for packaging, or for other applications that might occur to one skilled in the art.

SUMMARY OF THE INVENTION

It is one object of this invention to prepare a gas frothable epoxy foam system. It is another object to prepare a room temperature curing epoxy foam system. It is another object to prepare an epoxy foam. It is yet another object to prepare by gas frothing a shear-stable foam that can be troweled. These and other objects are achieved in an epoxy foam formulation that can be gas frothed, troweled, and that cures at room temperature comprising an organic epoxide and a polyamine curing agent, wherein the improvement comprises adding to the curing agent from about 2 to about 10 weight percent, based on the total weight of the formulation, of a fatty acid containing from about 8 to about 32 carbon atoms. An advantageous embodiment of the curing agent comprises at least 2 moles of a polyamine and 1 mole of a diepoxide to provide an amine terminated prepolymeric curing agent. Another embodiment of the curing agent comprises an adduct of equimolar quantities of tetraethylenepentamine and acrylonitrile partially polymerized with an organic epoxide to form a prepolymer which is then reacted with additional epoxide resin.

The polyamines of this invention can be polyfunctional aliphatic amines such as diethylenetriamine (DETA), triethylenetetramine (TETA), and tetraethylenepentamine (TEPA), although aromatic amines would be satisfactory. The choice of the amine depends upon the desired properties of the final product as selected by one skilled in the art. We found that diethylenetriamine and tetraethylenepentamine salts of a series of fatty acids, when used as the sole curing agent for an organic epoxide produced a very stable foam.

The organic epoxide to which this invention refers are the common or conventional epoxy resins obtained by reacting epichlorohydrin with a polyhydroxy compound such as bisphenol A; however, epoxy resins produced by this technique are not exhaustive since organic epoxides can be produced by other techniques, such as by the peracetic acid epoxidation of cyclic olefins. Thus, this invention contemplates a wide range of epoxy resins well known in the art which can be produced by a number of means, however, it has been found that an epoxide having a molecular weight of about 350 and an epoxide equivalent, i.e., the grams of resin containing one gram equivalent of epoxide, of about 185 to 192 produces a formulation, when mixed with the other components of this invention, forms a satisfactory froth.

The fatty acids to which this invention pertains include a large group of monocarboxylic acids. Although the term "fatty acid" has been restricted by some to the saturated acids of the acetic acid series, both normal and branched chain, it is generally used to include also related unsaturated acids, certain substituted acids, and even aliphatic acids containing alicyclic substituents. The naturally occurring fatty acids, with a few exceptions, are the higher straight chain, unsubstituted acids containing an even number of carbon atoms. The unsaturated fatty acids can be divided on the basis of the number of double bonds in the hydrocarbon chain into monethenoid, diethenoid, triethenoid, etc., and may be further classified depending upon the relative position of the double bonds. However, for the purpose of this invention it has been found that the fatty acids, both saturated and unsaturated, containing from 8 to 32 carbon atoms can be used. Those fatty acids containing less than 8 carbon atoms, such as acetic acid, or more than 32 carbon atoms will not produce a satisfactory foam.

The fatty acid used affects the stability of the foam. Very stable foams were produced which ranged in the degree of thixotropy, depending on the particular fatty acid used. Stearic acid, for example, produced an extremely thixotropic froth, whereas linoleic acid yielded a more fluid froth. Cast foam films of these systems also varied from very brittle in the case of stearic acid to very flexible in the case of linoleic acid. Other fatty acids found to be satisfactory include decanoic, lauric and oleic acids.

The curing agent is prepared by contacting at least two moles of the polyamine with one mole of a diepoxide to provide an amine-terminated curing agent. Amines such as DETA, TETA and TEPA can be used as the curing agent, although it is preferred to prepare a prepolymer by reacting the amine and the epoxide to reduce the temperature of the exothermic reaction after the fatty acid is added. The viscosity of the amine/epoxide curing agent depends on the ratio of the amine to epoxide and on the particular amine and epoxide used. The amine or the amine/epoxide prepolymer are mixed with from about 2 to about 10 weight percent of a fatty acid and then with additional epoxide. The formulation is then ready to be frothed to make a trowelable foam.

Surprisingly, it was found that an amide of the amine and fatty acid did not produce a froth foam that was sufficiently stable to be troweled. Amides produced by the condensation of a polyamine, such as DETA, TETA and TEPA, and a fatty acid such as linoleic acid produced a curing agent for the epoxide, but when the formulation was frothed, the resulting foam collapsed before the foam was completely cured. Thus, even though the prior art has taught the use of amides prepared from amines and fatty acids, it can be seen that the salts of polyamines and fatty acids are superior for preparing foams.

The amount of fatty acid in the formulation is important. At less than about one weight percent fatty acid, the foamed formulation cures before it can be conveniently troweled, indicating that the beneficial effects of the fatty acid are not realized. At greater than about 10 weight percent fatty acid, the foam is not stable. Fatty acid concentrations in the range of about 2 to about 5 weight percent, based on the total weight of the formulation, produced the best results.

Based on 100 parts of the epoxide, from 20 to 50 parts by weight of the amine or amine/epoxide curing agent are used. When the proportion of curing agent is increased above about 50 parts by weight, the resulting formulation does not have a sufficiently long pot life to permit extensive manipulation of the material. Below about 20 parts by weight of the curing agent, insufficient crosslinking occurs in the curing process and the mechanical properties of the material are impaired. It has been found that from 25 to 35 parts by weight provides optimum mechanical and physical properties to the formulation.

As an alternative embodiment acrylonitrile can be added slowly and with stirring to an equimolar quantity of a polyamine while maintaining the temperature below the boiling point of acrylonitrile (78°–80°C.). A low boiling solvent can be used to control the vigorous exotherm. When the addition is completed, the solution is allowed to cool to room temperature while stirring. The solvent is then removed from the amine-acrylonitrile adduct, and the adduct is mixed with from about 0.25 to about two molar equivalents of an organic epoxide, with about half molar equivalent being desirable. The mixture is reacted for several hours at about 60°C. to complete the partial polymerization. Then, one part of this partially polymerized product is mixed with about 2 weight percent of a fatty acid to form a partial salt, and this partial salt is then mixed with 3 parts of the organic epoxide. The formulation obtained by the above process can be frothed with air to produce a stable foam that can be troweled.

The viscosity of the uncured formulation is important. If the viscosity is too low, say about 6,000 c.p.s., the foam produced when nitrogen or air is whipped in the formulation tends to collapse. If the viscosity is too high, the formulation is to stiff to be frothed.

The techniques used to produce the froth are those that are well known in the art. As an example if the viscosity is less than about 25,000 c.p.s., the epoxy formulation can be placed in a mixer and the air or nitrogen whipped in. Alternately if the viscosity is greater than about 25,00 c.p.s., a reactor can be charged with the reactants and then sealed. Then, the reactor can be pressurized with nitrogen or air from about 20 to 100 pounds per square inch for about 5 minutes depending upon the size of the charge. The gas is incorporated into the reactants by stirring at say 400 revolutions per minute, and then the system depressurized rapidly without stirring to produce the froth. Other techniques that are well known in the art may be used with equal efficiency to produce the frothed epoxy.

It was found that nitrogen and air were effective for making the froth. Although, other gases could be used to provide lower density foams, care must be used to prevent foam collapse. As an example, nitrous oxide ($N_2O$) produced a satisfactory foam, but the foam collapsed in 10 to 15 minutes. Carbon dioxide reacted with the primary and secondary amine groups to produce intractable polycarbamic acid salts. Argon behaved similarly to nitrous oxide by producing a high volume foam, but one that collapsed rapidly. Dimethylether ($CH_3OCH_3$) produced a good foam, but the residual ether caused excessively long cure times.

DESCRIPTION OF THE PREFERRED EMBODIMENTS

The invention is illustrated by, but not limited to the following examples.

EXAMPLE 1

This example illustrates the use of linoleic acid with tetraethylenepentamine (TEPA).

To 28.0 grams (0.1 mole) of linoleic acid is added 18.9 grams (0.1 mole) of TEPA to form the salt. Then 35.5 grams of the salt are mixed with 100 grams of Epon 828. The mixture is placed in a pressure reactor, and the reactor is pressurized with nitrogen to about 40 pounds per square inch gage (p.s.i.g.). The mixture is stirred for about 5 minutes, and the reactor is depressurized rapidly. The resulting foam has a density of 0.316 gram per cubic centimeter (19.7 pounds per cubic foot) and is stable until hardening occurs.

Epon resins, available commercially from Shell Chemical Co. and as described in their Technical Publication SC:52-10, are polymers produced by condensation of epichlorohydrin with Bisphenol A. Epon 815, 820, 826, 828, 830 and 836 are lower molecular weight epoxy resins; Epon 828 has an average molecular weight of about 350.

EXAMPLE 2

This example illustrates the preparation of amine-terminated curing agent.

Prepolymeric curing agents are prepared by reacting at least two moles of an aliphatic polyamine with one mole of a diepoxide (Epon 828, 820, 815 or DER 732) to provide amine-terminated prepolymers. Viscosities vary depending upon this ratio and the polyamine and epoxy. Examples are shown in Table 1, which shows the compositions of the curing agent and the viscosity in centipoise at the indicated temperature.

Table 1

Composition and Viscosities of Prepolymeric Curing Agents

| Composition (Mole Ratios) | Viscosity, c.p.s. | (C°) |
|---|---|---|
| TEPA/Epon 828 (3.25:1) | 277,000–319,000 | (22) |
| TEPA/DER 732 (2:1) | 39,750 | (25) |
| DETA/DER 732 (2:1) | 17,000 | (25) |
| TEPA/DETA/Epon 828 (2:2:1) | 21,000 | (23.5) |
| DETA/Epon 828 (3:1) | 103,000 | (25) |
| DETA/Epon 828 (4:1) | 7,900 | (24.5) |
| DETA/Epon 820 (3:1) | 70,000 | (25) |
| DETA/Epon 815 (3:1) | 22,000 | (25) |

DER 732 is diepoxidized polyoxy propylene having an average molecular weight of 653; it is available commercially from Dow Chemical Company, Midland, Mich.

EXAMPLE 3

Diethylenetriamine, 50.6 grams is mixed throughly with 160.3 grams of DER 732 in a capped sample jar and allowed to react at room temperature for at least 12 hours, during which time an exotherm developed. For larger batches it is recommended that the DER 732 be added in portions with stirring to the diethylenetriamine. Linoleic acid, 2.5 grams is dissolved in 45.2 grams of the DETA/DER 732 prepolymer and the solution added to 80 grams of Epon 828 in a 1 quart, stirred pressure reactor. The pressure reactor is pressurized to 60 pounds per square inch gage (p.s.i.g.) with nitrogen and stirred for 5 minutes at 440 revolutions per minute (r.p.m.). The stirring was stopped and the pressure released. The resulting froth had a density of 0.190 gram per cubic centimeter and did not change appreciably after allowing it to cure at room temperature.

EXAMPLE 4

M-Phenylenediamine, 17.0 grams and 6.8 grams of linoleic acid were dissolved in 84.4 grams of the DETA/DER 732 prepolymer as described in Example 3 by warming to melt the m-phenylenediamine. When cooled to room temperature the entire mixture together with 240 grams of Epon 828 were weighed into the bowl of a Model N-50 Hobart mixer, blended 1 minute at low speed and whipped 5 minutes at high speed. The freshly prepared foam had a density of 0.363 grams per cubic centimeter. A 140 gram sample of one foam was weighed into a 1-quart ice cream carton and allowed to stand at room temperature. The carton became slightly warm after 30 minutes and the foam expanded slowly. When hardened the foam had a density of 0.276 grams per cubic centimeter.

Thus, it can be seen that one embodiment of this invention comprises a prepolymer of a polypropylene diepoxide with 40 to 60 percent of the total stoichiometric quantity of an alkyl polyamine and 40 to 60 percent of an aromatic primary amine.

EXAMPLE 5

Diethylenetriamine, 73.9 grams and 233.9 grams of DER-732 were weighed into a glass sample jar, capped and allowed to react for at least 12 hours. Triton X-200, 14.7 grams and 77.4 grams of m-phenylenediamine were added to the solution and warmed to melt and dissolve the m-phenylenediamine.

A foam was prepared by pressurizing a mixture of 41.8 grams of the above mixture with 90 grams of Epon 828 to 60 p.s.i. with nitrogen gas, stirring 5 minutes at 440 r.p.m. and releasing the pressure. The freshly prepared foam had a density of 0.185 grams per cubic centimeter. A 91.8 gram sample of the foam, after hardening at room temperature in a one-quart ice cream carton, had a density of 0.134 grams per cubic centimeter due to expansion during the slight exotherm that developed.

Triton X-200, an anionic surface-active agent, is a 28 percent aqueous dispersion of sodium alkykaryl polyether sulfonate available from Rohm and Haas Co., Philadelphia, Penna., and as described in their Technical Bulletin CS-25.

EXAMPLE 6

The density of the foam is further reduced as follows. About 100 grams of the uncured formulation of Example 5 is placed in a 1-quart ice cream carton, and is placed in a vacuum oven at about 360 Torr. The foam expands to fill the carton and the reduced pressure is maintained until the expanded foam hardens. The density of the expanded and hardened foam is about 0.09 gram per cubic centimeter.

EXAMPLE 7

Diethylenetriamine, 62.0 grams, is throughly mixed with 72 grams of Epon 815 in a capped jar and allowed to react at room temperature for at least 12 hours, during which time an exotherm develops. Linoleic acid, 2.5 grams, is dissolved in 27.1 grams of the DETA/Epon 815 prepolymer and added to 100 grams of Epon 828 in a one quart, stirred pressure reactor. The reactor was pressurized with nitrogen to 40 p.s.i.g. and stirred 5 minutes at 440 r.p.m. under pressure. The stirring was stopped and the pressure released. The resulting stable froth had a density of 0.294 grams per cubic centimeter.

EXAMPLE 8

These examples illustrate the use of a salt of an aliphatic polyamine and a fatty acid as a curing agent for an epoxide.

The salt is prepared by mixing 20 grams of lauric acid with 18.9 grams of TEPA. The froth is prepared by stirring for 5 minutes at 440 r.p.m. under 40 p.s.i.g. nitrogen pressure, a mixture of 100 grams of Epon 828 and 29.3 grams of the lauric acid — TEPA salt, then depressurizing. The resulting froth was very stable and had a density of 0.352 gram per cubic centimeter.

EXAMPLE 9

The salt was prepared by mixing 28.2 grams of oleic acid with 18.9 grams of TEPA. A mixture of 100 grams of Epon 828 and 35.5 grams of the oleic acid—TEPA salt when frothed as in Example 5 yielded a stable froth with a density of 0.345 gram per cubic centimeter.

EXAMPLE 10

The salt was prepared by mixing 28 grams of linoleic acid with 18.9 grams of TEPA. A mixture of 100 grams of Epon 828 and 35.3 grams of the linoleic acid-TEPA salt when frothed as in Example 5 yielded a stable froth with a density of 0.316 gram per cubic centimeter.

EXAMPLE 11

To a solution of 189.2 grams of tetraethylenepentamine in 100 milliliters of tetrahydrofuran 53.1 grams of acrylonitrile was added slowly and with stirring. When the addition was complete, the solution was stirred and allowed to cool to room temperature. The tetrahydrofuran was stripped from the adduct in a rotary evaporator.

The residue was mixed with 134.2 grams of Epon 828, and the mixture reacted for at least 6 hours at 60°C. to complete the reaction. Epon 828, is available commercially from Shell Chemical Company and is described in their Technical Bulletin SC:52-10. It is obtained by reacting epichlorohydrin with a polyhydroxy compound such as Bisphenol A in the presence of a catalyst. It has an average molecular weight of approximately 350 and a hydroxyl equivalent 189 to 192.

To prepare a foam 58.4 grams of the above product was mixed with 2.0 grams of linoleic acid, to form a partial salt and this product was mixed with 90 grams of Epon 828. When the above formulation was frothed with air, sealed in a pressure reactor, pressurized to 60 p.s.i. with nitrogen gas, stirred for 5 minutes at 440 r.p.m. and depressurized, it yielded a foam with a density of 0.316 gram per cubic centimeter. The foam was very stable and trowelable.

Although the invention has been described in terms of specified embodiments which are set forth in considerable detail, it should be understood that this is by way of illustration only, and that the invention is not necessarily limited thereto, since alternative embodiments and operating techniques will become apparent to those skilled in the art in view of the disclosure. Accordingly, modifications are contemplated which can be made without departing from the spirit of the described invention.

What we claim is:

1. A process for preparing a gas frothable epoxy foam that can be troweled and that cures a near room temperature which comprises the steps of:
   a. preparing an amine terminated prepolymer by mixing a polyamine with a polyepoxide in at least a 2 to 1 mole ratio;
   b. contacting the prepolymer with about 2 to about 10 weight percent of a fatty acid containing from about 8 to about 32 carbon atoms to form a curing agent;
   c. mixing from about 20 to about 50 parts by weight of the curing agent with 100 parts by weight of an organic epoxide, the uncured mixture having a viscosity of at least 5,000 centistokes; and
   d. foaming the uncured mixture by incorporating a gas comprising elemental nitrogen into the mixture.

2. A process of claim 1 wherein a gas such as nitrogen or air is incorporated into the uncured mixture at greater than atmospheric pressure.

3. A process of claim 1 comprising the further steps of:
   a. placing the foamed uncured mixture in a mold; and
   b. reducing the pressure in the mold to below atmospheric pressure until the mixture cures.

* * * * *